(12) United States Patent
Park et al.

(10) Patent No.: US 12,456,579 B2
(45) Date of Patent: Oct. 28, 2025

(54) MULTILAYER ELECTRONIC COMPONENT

(71) Applicant: SAMSUNG ELECTRO-MECHANICS CO., LTD., Suwon-si (KR)

(72) Inventors: Jung Won Park, Suwon-si (KR); Hyung Jong Choi, Suwon-si (KR); So Jung An, Suwon-si (KR); Yoo Jeong Lee, Suwon-si (KR); Kwang Yeun Won, Suwon-si (KR); Woo Kyung Sung, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 228 days.

(21) Appl. No.: 18/382,204

(22) Filed: Oct. 20, 2023

(65) Prior Publication Data

US 2024/0203646 A1 Jun. 20, 2024

(30) Foreign Application Priority Data

Dec. 16, 2022 (KR) .................. 10-2022-0176785

(51) Int. Cl.
*H01G 4/008* (2006.01)
*H01G 4/012* (2006.01)
(Continued)

(52) U.S. Cl.
CPC ............. *H01G 4/008* (2013.01); *H01G 4/012* (2013.01); *H01G 4/12* (2013.01); *H01G 4/232* (2013.01); *H01G 4/30* (2013.01)

(58) Field of Classification Search
CPC .......... H01G 4/008; H01G 4/012; H01G 4/12; H01G 4/232; H01G 4/30
See application file for complete search history.

(56) References Cited

U.S. PATENT DOCUMENTS

| 5,339,068 A | 8/1994 | Tsunoda et al. |
| 10,199,168 B2 * | 2/2019 | Yamaguchi .......... H01G 4/0085 |
| (Continued) | | |

FOREIGN PATENT DOCUMENTS

| JP | 11-126731 A | 5/1999 |
| JP | 2009-158662 A | 7/2009 |
| (Continued) | | |

OTHER PUBLICATIONS

European Search Report dated Jan. 3, 2025 issued in the corresponding European Patent Application No. 23205242.3.

*Primary Examiner* — Michael P McFadden
(74) *Attorney, Agent, or Firm* — Morgan, Lewis & Bockius LLP

(57) ABSTRACT

A multilayer electronic component according to an embodiment of the present disclosure includes a body including a dielectric layer and an internal electrode; and an external electrode disposed on the body. The external electrode includes a first electrode layer connected to the internal electrode and including Cu, a second electrode layer partially disposed on the first electrode layer and including Ni, an intermediate layer disposed on the second electrode layer and in a region of the first electrode layer, in which the second electrode layer is not disposed, and including a metal oxide, and a first plating layer disposed on the intermediate layer and including Ni.

27 Claims, 7 Drawing Sheets

(51) Int. Cl.
*H01G 4/12* (2006.01)
*H01G 4/232* (2006.01)
*H01G 4/30* (2006.01)

(56) References Cited

U.S. PATENT DOCUMENTS

| | | | |
|---|---|---|---|
| 2008/0118721 A1 | 5/2008 | Horie et al. | |
| 2009/0067117 A1* | 3/2009 | Kasuya | H01G 4/30 156/89.18 |
| 2013/0258546 A1 | 10/2013 | Kim et al. | |
| 2014/0204502 A1* | 7/2014 | Chun | H01G 4/30 361/301.4 |
| 2014/0347783 A1* | 11/2014 | Kisumi | H01G 4/2325 427/79 |
| 2015/0162132 A1* | 6/2015 | Kwag | H01G 4/2325 361/301.4 |
| 2015/0243439 A1* | 8/2015 | Kwag | H05K 1/181 361/301.4 |
| 2016/0086733 A1 | 3/2016 | Saito et al. | |
| 2016/0351332 A1* | 12/2016 | Lee | H01G 4/232 |
| 2018/0166215 A1* | 6/2018 | Hamanaka | H01G 4/12 |
| 2018/0174753 A1* | 6/2018 | Terashita | H01G 4/008 |
| 2019/0355518 A1* | 11/2019 | Harada | H01G 4/30 |
| 2020/0135403 A1* | 4/2020 | Lee | H01G 4/12 |
| 2021/0012965 A1* | 1/2021 | Lee | H01G 4/012 |
| 2021/0057153 A1 | 2/2021 | Jun et al. | |
| 2021/0065980 A1* | 3/2021 | Jung | H01G 4/005 |
| 2021/0125780 A1 | 4/2021 | Hayashi et al. | |
| 2022/0208473 A1 | 6/2022 | Yun et al. | |
| 2023/0135148 A1* | 5/2023 | Kang | H01G 4/232 |

FOREIGN PATENT DOCUMENTS

| | | |
|---|---|---|
| JP | 2021-068851 A | 4/2021 |
| KR | 10-1731298 B1 | 4/2017 |

* cited by examiner

MULTILAYER ELECTRONIC COMPONENT

CROSS-REFERENCE TO RELATED APPLICATION(S)

This application claims benefit of priority to Korean Patent Application No. 10-2022-0176785 filed on Dec. 16, 2022 in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, may be a chip-type condenser mounted on the printed circuit boards of any of various types of electronic products, such as an imaging device, including a liquid crystal display (LCD) or a plasma display panel (PDP), a computer, a smartphone, or a mobile phone, serving to charge or discharge electricity therein or therefrom.

Such a multilayer ceramic capacitor may have a reduced size, may implement high capacitance, and may be easily mounted on a circuit board, and may thus be used as a component of various electronic devices. There has been increasing demand for a multilayer ceramic capacitor to have a reduced size and higher capacitance as each of various electronic devices such as a computer and a mobile device have a reduced size and higher output.

In addition, in recent years, as industry interest in electronic products has increased, multilayer ceramic capacitors have been required to have high reliability and high strength characteristics to be used in automobiles and infotainment systems.

As one method for improving moisture resistance of multilayer electronic components, there is a method of increasing density or a thickness of Cu-based external electrodes. However, when miniaturization and high capacitance of multilayer electronic components are required, there is a limit to improving moisture resistance by controlling the thickness of external electrodes.

As another method for improving the moisture resistance reliability of the multilayer electronic component, there is a method of removing residual hydrogen through a heat-treatment process after forming all of a plating layer of external electrodes.

However, through a process such as sintering of the external electrode and formation of the plating layer, a layer including a metal oxide may be formed between layers of the external electrodes, and the oxide layer may cause deterioration of interlayer adhesion of the external electrodes.

Therefore, even when a layer including a metal oxide is formed between the layers of the external electrodes, it is necessary to develop a structure of the external electrodes to suppress deterioration of the interlayer adhesion of the external electrodes.

SUMMARY

One of several objects of the present disclosure is to suppress deterioration of insulation resistance (IR) of a multilayer electronic component in a high-temperature and high-humidity environment.

One of the various objects of the present disclosure is to suppress deterioration of moisture resistance reliability of a multilayer electronic component due to deterioration of interlayer adhesion due to formation of oxides between electrode layers in a multilayer structure of external electrodes.

However, the object of the present invention is not limited to the above, and will be more easily understood in the process of describing specific embodiments of the present disclosure.

According to an aspect of the present disclosure, a multilayer electronic component includes: a body including a dielectric layer and an internal electrode; and an external electrode disposed on the body. The external electrode includes a first electrode layer connected to the internal electrodes and including Cu, a second electrode layer partially disposed on the first electrode layer and including Ni, an intermediate layer disposed on the second electrode layer and in a region of the first electrode layer, in which a second electrode layer is not disposed, and including a metal oxide, and a first plating layer disposed on the intermediate layer and including Ni.

According to an aspect of the present disclosure, a multilayer electronic component includes: a body including a dielectric layer and an internal electrode; an external electrode disposed on the body. The external electrode includes a first electrode layer connected to the internal electrodes and including Cu, a second electrode layer disposed on the first electrode layer and including Ni, an intermediate layer disposed on the second electrode layer and including a metal oxide, and a first plating layer disposed on the intermediate layer and including Ni. The second electrode layer includes a plurality of openings penetrating through the second electrode layer. The intermediate layer is disposed on the second electrode layer and the plurality of openings.

According to an aspect of the present disclosure, a multilayer electronic component includes: a body including a dielectric layer and an internal electrode; and an external electrode disposed on the body to connect to the internal electrode. The external electrode includes a first electrode layer connected to the internal electrode, a second electrode layer disposed on the first electrode layer and including an opening penetrating through the second electrode layer, a first plating layer covering the second electrode layer and disposed in the opening to cover the first electrode layer, and an oxide layer disposed between the second electrode layer and the first plating layer and disposed in the opening to be between the first electrode layer and the first plating layer.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
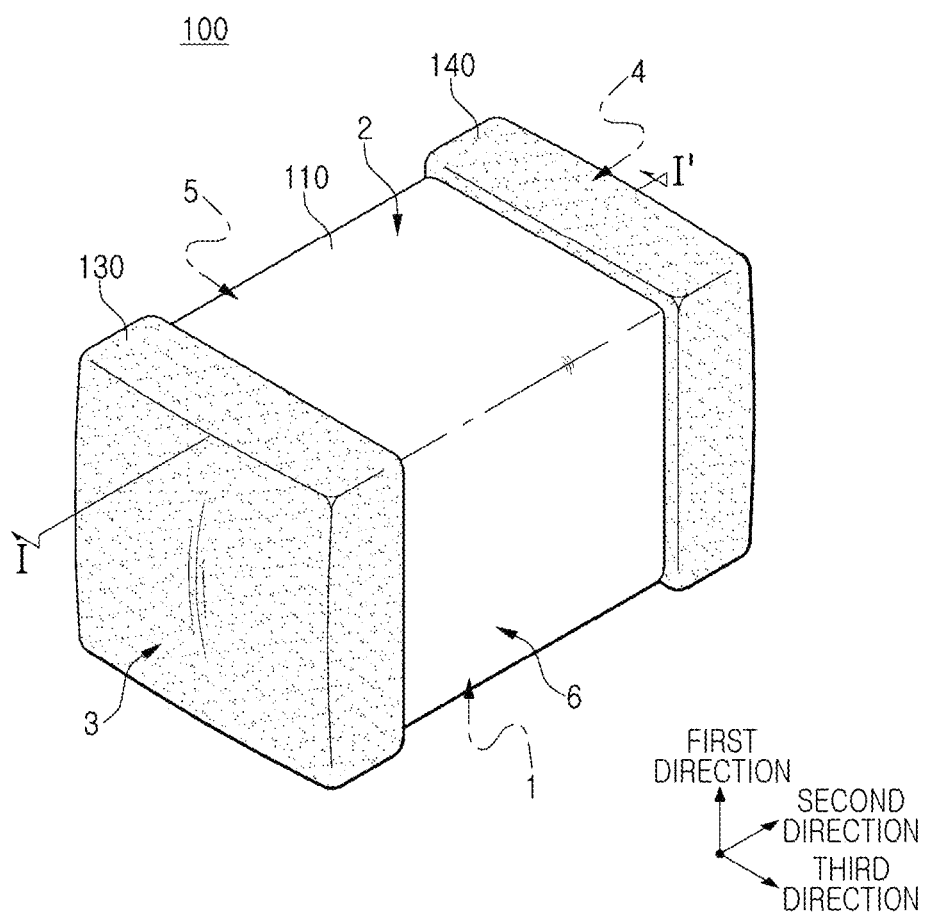
FIG. 1 is a perspective view schematically illustrating a multilayer electronic component according to an embodiment of the present disclosure.

Hereinafter, embodiments of the present disclosure will be described as follows with reference to the attached drawings. The present may, however, disclosure be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may further include other components as well, rather than excluding other components, unless specifically stated otherwise.

In the drawings, a first direction may refer to a stacking direction or a thickness (T) direction, a second direction may refer to a length (L) direction, and a third direction may refer to a width (W) direction.

FIG. 1 is a perspective view schematically illustrating a multilayer electronic component according to an embodiment of the present disclosure.

Figure 2:
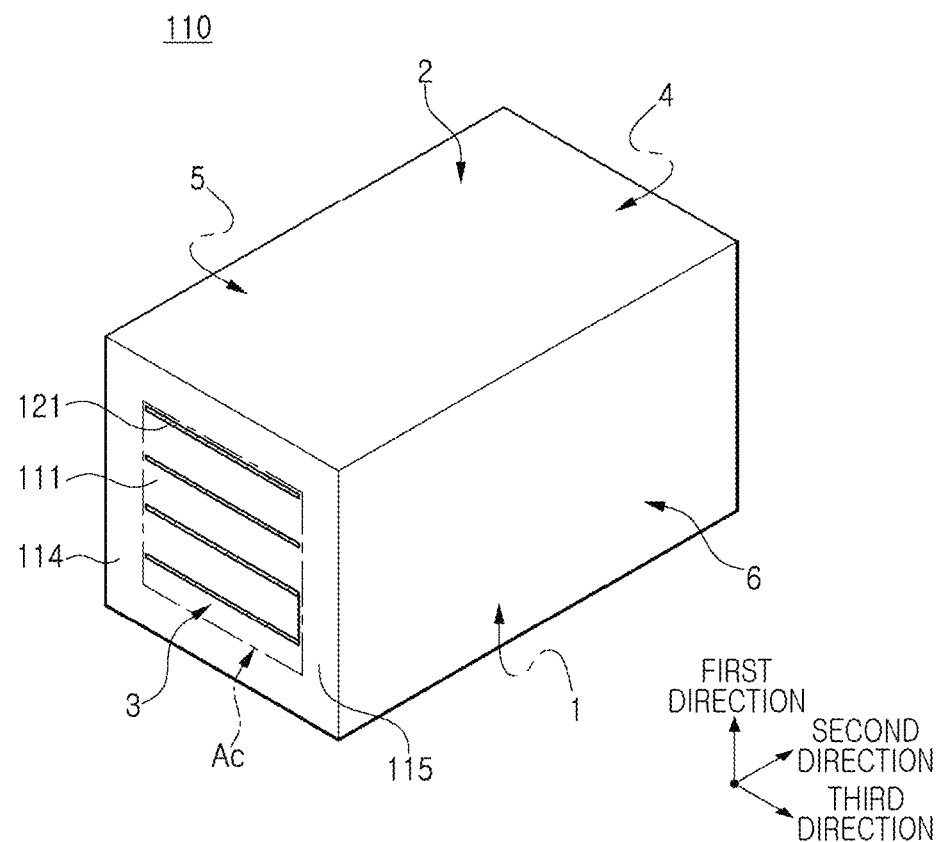
FIG. 2 is a perspective view schematically illustrating the body of FIG. 1.

FIG. 2 is a perspective view schematically illustrating the body of FIG. 1.

Figure 3:
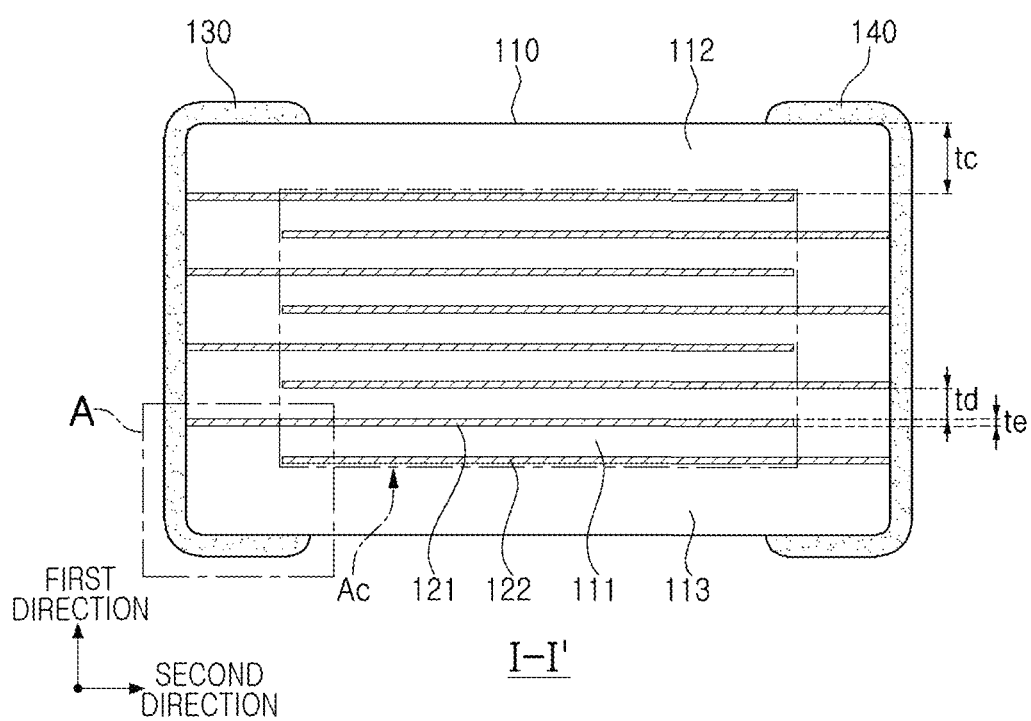
FIG. 3 is a schematic cross-sectional view taken along line I-I' of FIG. 1.

FIG. 3 is a schematic cross-sectional view taken along line I-I' of FIG. 1.

Figure 4:
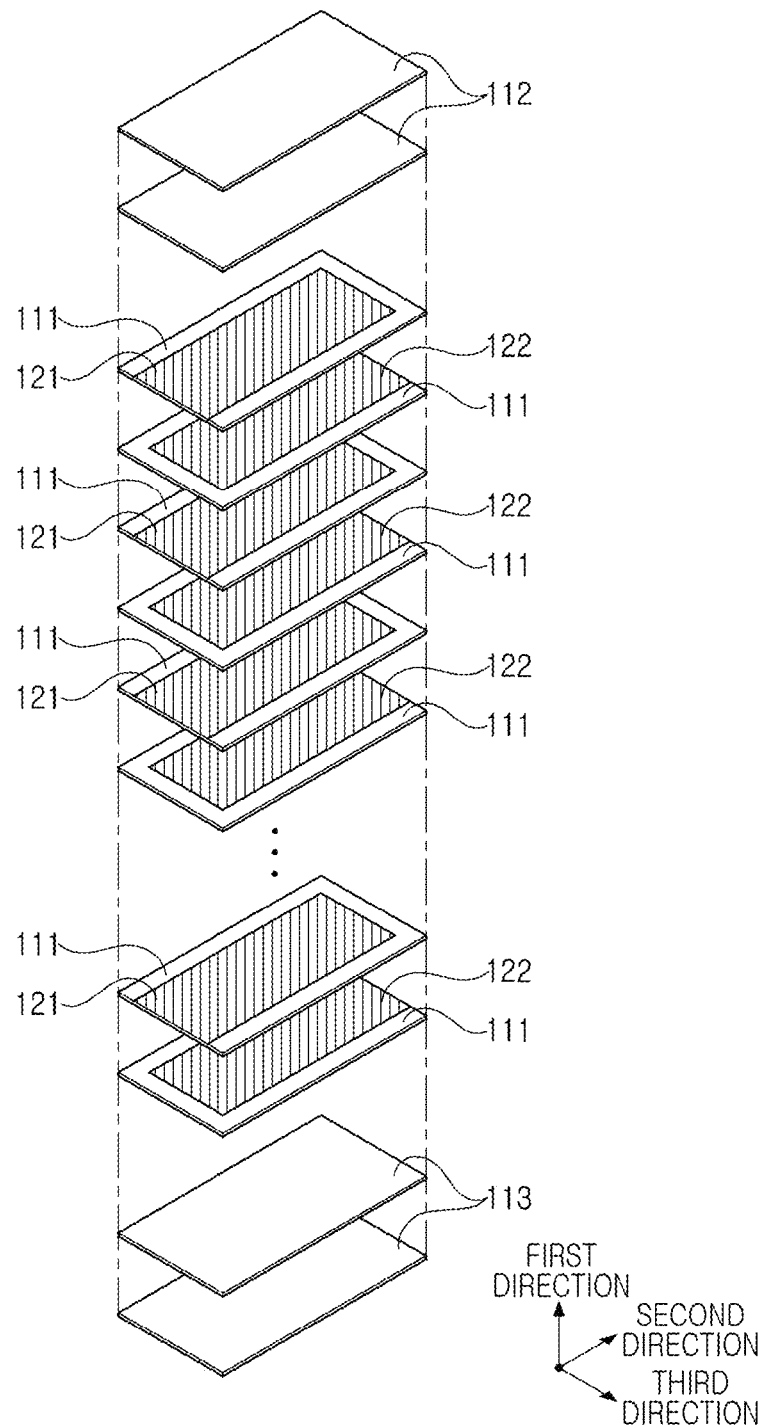
FIG. 4 is an exploded perspective view illustrating a body of the multilayer electronic component according to an embodiment of the present disclosure.

FIG. 4 is an exploded perspective view illustrating a body of the multilayer electronic component according to an embodiment of the present disclosure.

Figure 5:
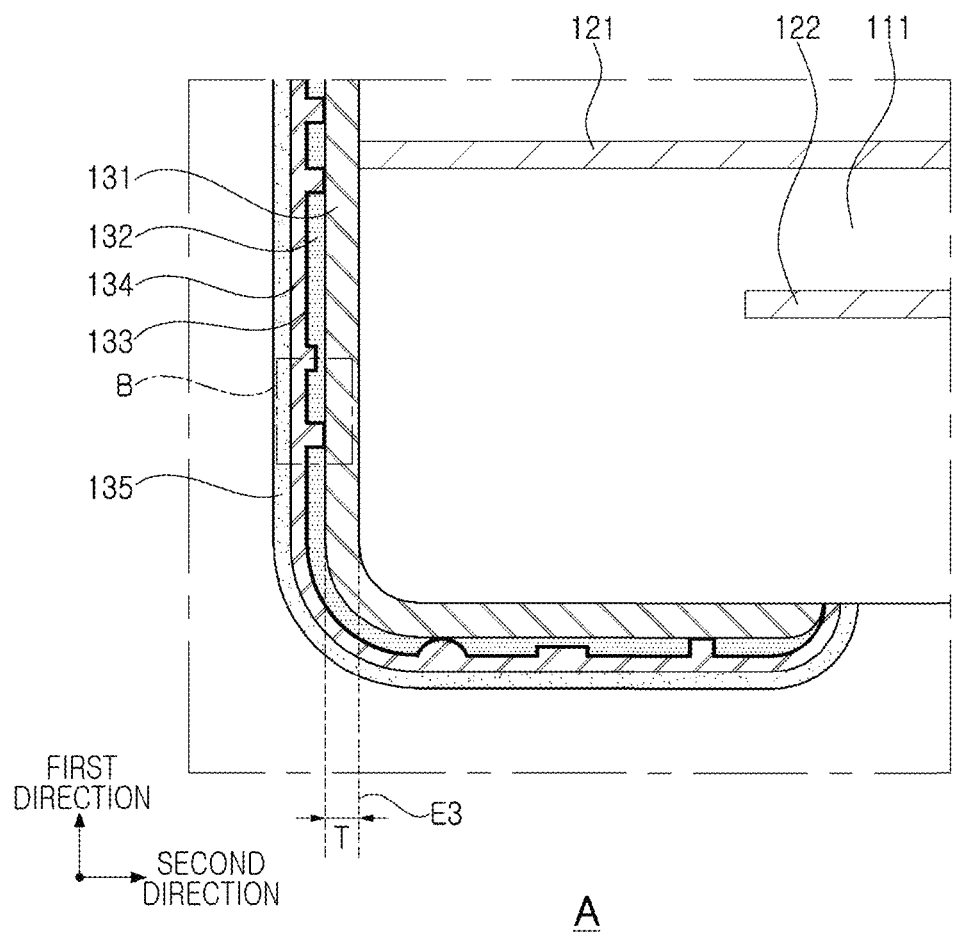
FIG. 5 is an enlarged view of region A of FIG. 3.

FIG. 5 is an enlarged view of region A of FIG. 3.

Figure 6:
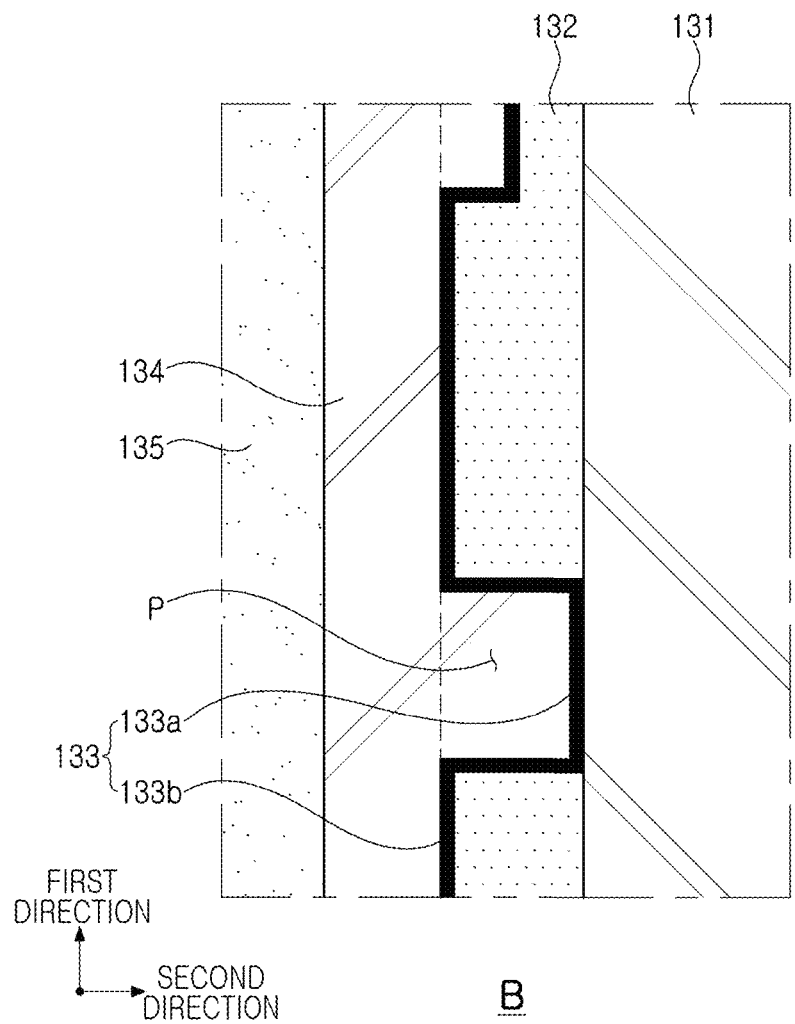
FIG. 6 is an enlarged view of region B of FIG. 5.

FIG. 6 is an enlarged view of region B of FIG. 5.

Figure 7:
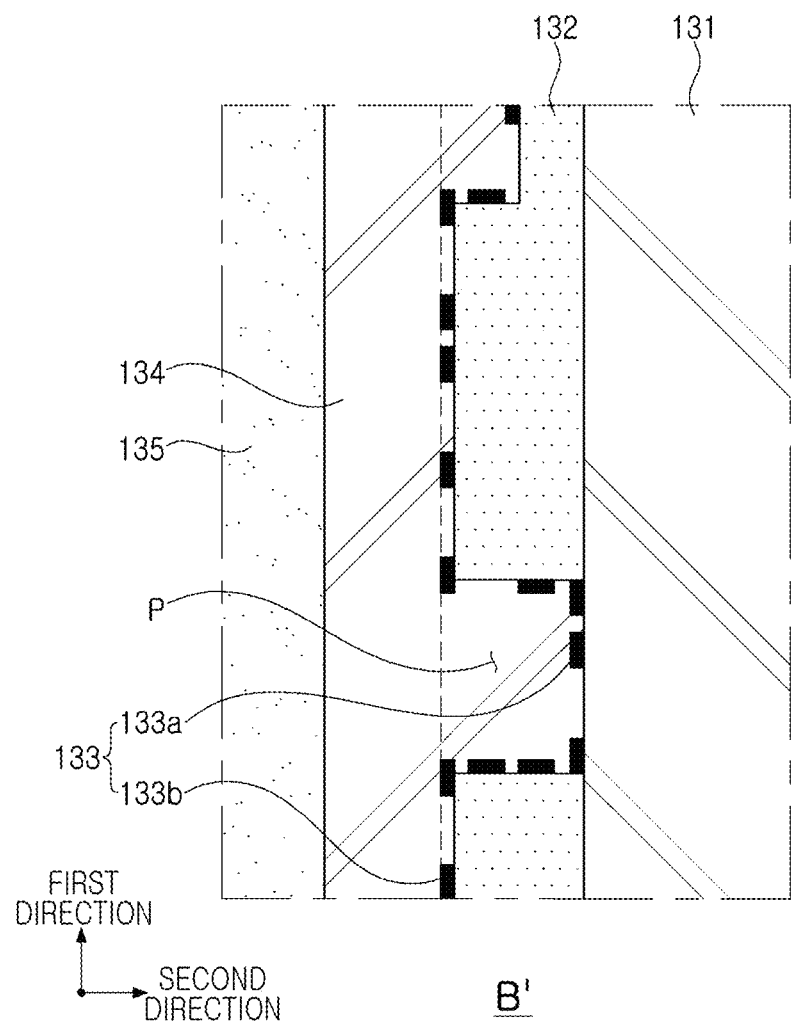
FIG. 7 is an enlarged view of region B' corresponding to region B of FIG. 5 in an embodiment.

FIG. 7 is an enlarged view of region B' corresponding to region B of FIG. 5 in an embodiment.

Hereinafter, a multilayer electronic component 100 according to an embodiment in the present disclosure will be described with reference to FIGS. 1 to 7.

According to an embodiment of the present disclosure, the multilayer electronic component 100 includes: a body 110 including a dielectric layer 111 and internal electrodes 121 and 122 alternately disposed with the dielectric layer 111 interposed therebetween; and external electrodes 130 and 140 disposed on the body. The external electrodes 130 and 140 include a first electrode layer 131 connected to the internal electrodes 121 or 122 and including Cu, a second electrode layer 132 partially disposed on the first electrode layer 131 and including Ni, an intermediate layer 133 disposed in a region of the first electrode layer 131, in which a second electrode layer 132 is not disposed and on the second electrode layer 132 and including a metal oxide, and a first plating layer 134 disposed on the intermediate layer 133 and including Ni.

The body 110 includes a dielectric layer 111 and internal electrodes 121 and 122 alternately disposed with the dielectric layer 111 interposed therebetween. In the body 110, the dielectric layer 111 and the internal electrodes 121 and 122 may be alternately stacked, and the stacking direction may be referred to as a first direction.

The body 110 is not limited to a particular shape, and may have a hexahedral shape or a shape similar to the hexahedral shape, as illustrated in the drawings. The body 110 may not have the shape of a hexahedron having perfectly straight lines because ceramic powder particles included in the body 110 are contracted in a process in which the body is sintered. However, the body 110 may have a substantially hexahedral shape.

Referring to FIG. 2, the body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4, and opposing each other in a third direction.

A plurality of dielectric layers 111 forming the body 110 may be in a sintered state, and adjacent dielectric layers 111 may be integrated with each other, such that boundaries therebetween may not be readily apparent without a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, a raw material of the dielectric layer 111 may include various ceramic additives, organic solvents, binders, dispersants, and the like, added to powder particles such as barium titanate ($BaTiO_3$) powder particles, or the like, according to an object of the present disclosure.

Meanwhile, an average thickness "td" of the dielectric layer 111 is not particularly limited. However, in general, when the dielectric layer is thinly formed to have an average thickness of less than 0.6 µm, in particular, when the multilayer electronic component is miniaturized as in the case in which the average thickness "td" of the dielectric layer is 0.35 µm or less, it may be difficult for reliability to be improved.

According to an embodiment of the present disclosure, since a second electrode layer 132 partially disposed on the first electrode layer 131 including Cu and including Ni, is disposed, an intermediate layer 133 including a metal oxide is disposed in a region of the first electrode layer 131, in which a second electrode layer 132 is not disposed and on the second electrode layer 132, and a first plating layer 134 including Ni is disposed on the intermediate layer 133, even when an average thickness "td" of the dielectric layer is 0.35 µm or less, excellent reliability can be secured.

Accordingly, when the average thickness "td" of the dielectric layer 111 is 0.35 µm or less, a reliability improvement effect according to the present disclosure may be more remarkable, and miniaturization and high capacitance of the multilayer electronic component may be easily achieved.

The average thickness "td" of the dielectric layer 111 may mean an average thickness of the dielectric layer 111 disposed between the first and second internal electrodes 121 and 122.

The average thickness of the dielectric layer 111 may be measured by scanning an image of a cross-section of the body 110 in length and thickness directions (L-T directions) with a scanning microscope electron (SEM) with a magnification of 10,000. More specifically, an average value may be measured by measuring a thickness of one dielectric layer at 30 equally spaced points in the length direction from the scanned image. The 30 points having equal intervals may be designated in the capacitance formation portion Ac. In addition, if the average value is measured by extending the average value measurement to 10 dielectric layers, the average thickness of the dielectric layers can be more generalized.

Referring to FIG. 3, the body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac.

In addition, the capacitance formation portion Ac is a portion serving to contribute to capacitance formation of a capacitor, and may be formed by repeatedly stacking a plurality of first and second internal electrodes 121 and 122 with a dielectric layer 111 interposed therebetween.

The upper cover portion 112 and the lower cover portion 113 may be formed by stacking a single dielectric layer or two or more dielectric layers on the upper and lower surfaces of the capacitance formation portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111. That is, the upper cover portion 112 and the lower cover portion 113 may include a ceramic material, for example, a barium titanate (BaTiO$_3$)-based ceramic material.

An average thickness "tc" of the cover portions 112 and 113 need not be particularly limited. However, the average thickness "tc" of the cover portions 112 and 113 may be 20 μm or less in order to more easily achieve miniaturization and high capacitance of the multilayer electronic component.

In addition, according to an embodiment of the present disclosure, since a second electrode layer 132 including Ni partially disposed on the first electrode layer 131 including Cu is disposed, an intermediate layer 133 including a metal oxide is disposed in a region of the first electrode layer 131 in which a second electrode layer 132 is not disposed and on the second electrode layer 132, and a first plating layer 134 including Ni is disposed on the intermediate layer 133, even when the average thickness "tc" of the cover portions 112 and 113 is 20 μm or less, excellent reliability can be secured.

The average thickness "tc" of the cover portions 112 and 113 may mean a size thereof in the first direction, and may be a value obtained by averaging sizes of the cover portions 112 and 113 measured in the first direction at five points having equal intervals above or below the capacitance formation portion Ac.

Referring to FIG. 2, margin portions 114 and 115 may be disposed on one surface and the other surface of the capacitance formation portion Ac in the third direction.

The margin portions 114 and 115 may include a margin portion 114 disposed on the fifth surface 5 of the body 110 and a margin portion 115 disposed on the sixth surface 6 thereof. That is, the margin portions 114 and 115 may be disposed on both side surfaces of the body in a width direction.

The margin portions 114 and 115 may mean a region between both ends of the first and second internal electrodes 121 and 122 and an interface of the body 110 in a cross-section of the body 110 taken in a width-thickness (W-T) direction, as illustrated in FIG. 2.

The margin portions 114 and 115 may basically serve to prevent damages to the internal electrodes due to physical or chemical stresses.

The margin portions 114 and 115 may be formed by applying a conductive paste to the ceramic green sheet, except where margin portions are to be formed, to form an internal electrode.

In addition, in order to suppress a step portion due to the internal electrodes 121 and 122, after the internal electrodes are cut so as to be exposed to the fifth and sixth surfaces 5 and 6 of the body after lamination, the margin portions 114 and 115 may also be formed by stacking a single dielectric layer or two or more dielectric layers on both side surfaces of the capacitance formation portion Ac in the width direction.

Meanwhile, a width of the margin portions 114 and 115 is not particularly limited. However, in order to more easily implement miniaturization and high capacitance of the multilayer electronic component, an average width of the margin portions 114 and 115 may be 15 μm or less.

The average width of the margin portions 114 and 115 may mean an average size of the margin portions 114 and 115 in a third direction, and may be a value obtained by averaging sizes of the margin portions 114 and 115 measured at five points at equal intervals in the third direction in terms of the capacitance formation portion Ac.

The internal electrodes 121 and 122 are alternately disposed with the dielectric layer 111.

The internal electrodes 121 and 122 may include first and second internal electrodes 121 and 122. The first and second internal electrodes 121 and 122 may be alternately disposed to oppose each other with the dielectric layer constituting the body 110 interposed therebetween, and may be exposed to (or be in contact with or extend from) the third and fourth surfaces 3 and 4 of the body 110, respectively.

Referring to FIG. 3, the first internal electrode 121 may be spaced apart from the fourth surface 4 and exposed through (or be in contact with or extend from) the third surface 3, and the second internal electrode 122 may be spaced apart from the third surface 3 and exposed through (or be in contact with or extend from) the fourth surface 4.

In this case, the first and second internal electrodes 121 and 122 may be electrically isolated from each other by the dielectric layer 111 disposed in a middle.

Referring to FIG. 4, the body 110 may be formed by alternately stacking a ceramic green sheet on which the first internal electrode 121 is printed and a ceramic green sheet on which the second internal electrode 122 is printed, followed by sintering.

A material for forming the internal electrodes 121 and 122 are not particularly limited, and as the material, a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) and alloys thereof on a ceramic green sheet. A method for printing the conductive paste for the internal electrodes may be a screen-printing method or a gravure printing method, but the present disclosure is not limited thereto.

Meanwhile, an average thickness "te" of the internal electrodes 121 and 122 is not particularly limited. However, in general, when the internal electrodes are thinly formed to have a thickness of less than 0.6 µm, in particular, when the multilayer electronic component is miniaturized as in the case in which the thickness of the internal electrodes is 0.35 µm or less, it may be difficult that moisture resistance reliability is improved.

According to an embodiment of the present disclosure, since a second electrode layer 132 partially disposed on the first electrode layer 131 including Cu and including Ni, is disposed, an intermediate layer 133 including a metal oxide is disposed in a region of the first electrode layer 131, in which a second electrode layer 132 is not disposed and on the second electrode layer 132, and a first plating layer 134 including Ni is disposed on the intermediate layer 133, even when the average thickness of the internal electrodes 121 and 122 is 0.35 µm or less, excellent reliability can be secured.

Accordingly, when the average thickness of the internal electrodes 121 and 122 is 0.35 µm or less, an effect according to the present disclosure may be more remarkable, and miniaturization and high capacitance of the multilayer electronic component may be easily achieved.

The average thickness "te" of the internal electrodes 121 and 122 may mean an average thickness of the internal electrodes 121 and 122.

The average thickness of the internal electrodes 121 and 122 may be measured by scanning an image of a cross-section of the body 110 in length and thickness directions (L-T directions) with a scanning electron microscope (SEM) with a magnification of 10,000. More specifically, an average value may be measured by measuring a thickness of one internal electrode at 30 equally spaced points in the length direction from the scanned image. The 30 points having equal intervals may be designated in the capacitance formation portion Ac. In addition, if the average value is measured by extending the average value measurement to 10 internal electrodes, the average thickness of the internal electrodes can be more generalized.

External electrodes 130 and 140 are disposed on the body 110.

The external electrodes 130 and 140 may include a first external electrode 130, in contact with the third surface 3 of the body 110 and a second external electrode 140, in contact with the fourth surface 4 of the body 110.

Hereinafter, a structure of the external electrodes 130 and 140 will be described based on the first external electrode 130. The description of the first external electrode 130 may be equally applied to the second external electrode 140.

Insulation resistance (IR) of a multilayer electronic component such as a multilayer ceramic capacitor may be deteriorated in a high-temperature and high-humidity environment. In order to improve this, it is necessary to delay or prevent permeation of moisture or deterioration-causing substances such as hydrogen into the body 110 of the multilayer electronic component 100.

In the conventional case, in order to prevent deterioration of the insulation resistance, a method of densely forming an external electrode composed of Cu as a main component, or increasing a thickness of the external electrode was used. However, due to miniaturization and high capacitance of the multilayer electronic component, there is a limit to the method of preventing deterioration of insulation resistance through thickness control of the external electrode mainly composed of Cu.

Meanwhile, as another method for improving moisture resistance reliability of the multilayer electronic component, there is a method of removing residual hydrogen through a heat-treatment process after forming all of the plating layers of the external electrodes. However, through a process such as sintering external electrodes and the forming a plating layer, a layer including a metal oxide may be formed between layers of the external electrode, and the oxide layer may cause deterioration of interlayer adhesion of the external electrodes.

Even when an intermediate layer including a metal oxide is formed in a region of the first electrode layer 131, in which a second electrode layer 132 is not disposed and on the second electrode layer 132 as a first plating layer 134 including Ni is formed on the first electrode layer 131, by disposing a second electrode layer 132 including Ni, partially disposed on the first electrode layer 131 connected to the internal electrode and including Cu. Accordingly, airtightness of the external electrode 130 of the multilayer electronic component 100 can be secured, thereby improving the moisture resistance reliability of the multilayer electronic component 100.

Referring to FIGS. 5 and 6, the external electrode 130 includes a first electrode layer 131 connected to the internal electrode 121 and including Cu.

The first electrode layer 131 may include Cu, a conductive metal, and may serve to electrically connect the external electrode 130 to the internal electrode 121 by being connected to the internal electrode 121. The first electrode layer 131 may further include one or more of conductive metal elements and alloys thereof in addition to Cu. Specifically, the first electrode layer 131 may include one or more of Ni, Pd, Cr and alloys thereof, in addition to Cu.

A method of forming the first electrode layer 131 is not particularly limited. The first electrode layer 131 may be formed by applying a conductive paste including Cu particles and glass to the third and fourth surfaces 3 and 4 of the body 110, drying and sintering the same, but it is not limited thereto, and may be formed by applying Cu particles to the third and fourth surfaces 3 and 4, drying and sintering the same, by electroplating or electroless plating.

The external electrode 130 includes an intermediate layer 133 disposed on a region of the first electrode layer 131, in which a second electrode layer 132 is not disposed and on the second electrode layer 132 and including a metal oxide. In a process of forming a first plating layer 134 including Ni in a region of the first electrode layer 131, in which a second electrode layer 132 is not disposed and on the second electrode layer 132, a process of forming the first plating layer 134 and then performing a heat-treatment for removing hydrogen, or forming a second electrode layer 132, the intermediate layer 133 may be formed by oxidizing conductive metal included in the first electrode layer 131 or the second electrode layer 132. In this case, a thickness of the intermediate layer 133 may be less than a thickness of each of the first electrode layer 131, the second electrode layer 132, and the first plating layer 134.

The external electrode 130 includes a first plating layer 134 disposed on the intermediate layer 133 and including Ni. The first plating layer 134 may include Ni, to serve to improve airtightness of the multilayer electronic component. Therefore, it is preferable that the first plating layer 134 is a plating layer not including glass, but is not limited thereto. A method for forming the first plating layer 134 is not particularly limited and may be formed using various plating methods such as electroplating, electroless plating, or the like.

The external electrode 130 includes a second electrode layer 132 partially disposed on the first electrode layer 131 and including Ni. The second electrode layer 132 is partially disposed on the first plating layer 131, even when the intermediate layer 133 including the metal oxide generated in a process of forming the first plating layer 134 is formed in a region of the first electrode layer 131, in which a second electrode layer 132 is not disposed and on the second electrode layer 132, so that interlayer adhesion of the external electrode 130 may be secured. The meaning that the second electrode layer 132 is "partially disposed" on the first electrode layer 131 may mean that the second electrode layer 132 is disposed so as not to cover at least a portion of the first electrode layer 131, but it is not limited thereto, which may mean that the second electrode layer 132 has a structure of having a plurality of openings penetrating through the second electrode layer 132, and the second electrode layer 132 has a porous structure having a plurality of pores.

The second electrode layer 132 may be partially disposed on the first electrode layer 131, to improve an area on which the first plating layer 134 is formed. When the second electrode layer 132 is formed only on some surfaces of the first electrode layer 131 instead of an entire surface thereof, the second electrode layer 132 may act as irregularities on the first electrode layer 131. Accordingly, an anchor effect may be applied to the first plating layer 134. That is, as the second electrode layer 132 is partially disposed on the first electrode layer 131, an area on which the plating layer 134 is formed is increased, and an anchor effect may be caused, so that the interlayer adhesion the external electrode 130 may be improved. Accordingly, moisture resistance reliability of the multilayer electronic component 100 may be improved.

In an embodiment, the intermediate layer 133 may include an oxide including metal included in the first electrode layer 131 and an oxide including metal included in the second electrode layer 132. In a specific embodiment, the metal oxide included in the intermediate layer 133 may include at least one of an oxide including Cu and an oxide including Ni. The metal oxide included in the intermediate layer 133 may be formed by oxidizing the metal included in the first electrode layer 131 and the second electrode layer 132. Thus, at least one of oxides including Cu included in the first electrode layer 131 and Ni included in the second electrode layer 132 may be included in the intermediate layer 133. In this case, the oxide including Cu may be at least one of CuO, Cu$_2$O, and Cu$_3$O$_4$, and the oxide including Ni may be NiO, but is not limited thereto.

In an embodiment, the intermediate layer 133 may include an oxide including Cu in a region 133a disposed on the first electrode layer 131 on which the second electrode layer 132 is not disposed, and may include an oxide including Ni in a region 133b disposed on the second electrode layer 132.

Referring to FIG. 6, the intermediate layer 133 may be divided into a region 133a disposed on the first electrode layer 131 and a region 133b disposed on the second electrode layer 132. When a heat-treatment process of removing hydrogen is performed after forming the intermediate layer 133, the second electrode layer 132 may be deformed into a shape partially disposed on the first electrode layer 131. Simultaneously, a surface of the second electrode layer 132 and a surface of the first electrode layer 131 may be oxidized. Meanwhile, since the first electrode layer 131 includes Cu, when an oxide including Cu is formed on the surface of the first electrode layer 131, there may be a problem in that adhesion with the first plating layer 134 including Ni may decrease. According to an embodiment of the present disclosure, since the intermediate layer 133 includes an oxide including Ni in a region 133b disposed on the second electrode layer 132, it is possible to suppress deterioration of the adhesion of the first plating layer 134 may be further suppressed as compared to when the intermediate layer 133 is made of only an oxide including Cu. Accordingly, moisture resistance reliability of the multilayer electronic component 100 can be further improved.

Referring to FIG. 7, in an embodiment, the intermediate layer 133 may be partially disposed on the first electrode layer 131 and the second electrode layer 132. Since the intermediate layer 133 includes a metal oxide, adhesion with the first plating layer 134 basically including Ni may be weak. In an embodiment, a contact area may be improved by partially disposing the intermediate layer 133 on the first electrode layer 131 and the second electrode layer 132, and the first plating layer 134 may be formed in a gap in which the intermediate layer 133 is partially formed, so that an anchor effect can be maximized. Accordingly, the moisture resistance reliability of the multilayer electronic component 100 can be further improved.

In an embodiment, an average thickness "T" of the first electrode layer 131 may be 2 μm or more and 20 μm or less. When the average thickness "T" of the first electrode layer 131 is less than 2 μm, there is a possibility that breakage may occur in the first electrode layer 131. Therefore, when the average thickness "T" of the first electrode layer 131 is 2 μm or more, as in an embodiment, the moisture resistance reliability of the multilayer electronic component 100 may be further improved by forming the first electrode layer 131 without interruption.

A method for measuring the average thickness "T" of the first electrode layer 131 is not particularly limited. The average thickness "T" of the first electrode layer 131 may be a value obtained by being polished to a central portion of the multilayer electronic component 100 in a second direction, and exposing surfaces thereof in first and second directions, and then measuring a size between an end of the first electrode layer 131 in a second direction and an extension line E3 of the third surface of the first electrode layer 131 in a second direction at five or more equally spaced points in a region between uppermost ends and lowermost ends of the internal electrodes 121 and 122 and averaging the same.

In an embodiment, the external electrode 130 may further include a second plating layer 135 disposed on the first plating layer 134 and including Sn. Accordingly, mountability of the multilayer electronic component 100 can be improved. The second plating layer 135 may be formed by plating Sn on the first plating layer 134 and may be formed in the same manner as the first plating layer.

A size of the multilayer electronic component 100 is not particularly limited. However, in order to achieve miniaturization and high capacitance at the same time, the thickness of the dielectric layer and internal electrodes should be thinned to increase the number of stacked layers, so that the present disclosure may be applied to the multilayer electronic component 100 having a size of 0603 (length×width, 0.6 mm×0.3 mm) or less. Here, the length of the multilayer electronic component 100 may mean a maximum size of the multilayer electronic component 100 in the second direction, and the width of the multilayer electronic component 100 means a maximum size of the multilayer electronic component 100 in the third direction.

Hereinafter, according to an embodiment of the present disclosure, another aspect of a multilayer electronic component 100 will be described, but a description overlapping the multilayer electronic component 100 according to an embodiment of the present disclosure described above will be omitted.

According to another aspect of the multilayer electronic component 100 of an embodiment of the present disclosure, the external electrodes 130 and 140 includes a first electrode layer 131 connected to the internal electrode 121, a second electrode layer 132 disposed on the first electrode layer 131 and including Ni, an intermediate layer 133 disposed on the second electrode layer 132 and including a metal oxide, and a first plating layer 134 disposed on the intermediate layer 133 and including Ni, and the second electrode layer 132 includes a plurality of openings P, and the intermediate layer 133 is disposed on the second electrode layer 132 and the plurality of openings P.

The second electrode layer 132 includes a plurality of openings P penetrating through the second electrode layer 132. However, in the present disclosure, the second electrode layer 132 is not limited to including only a plurality of openings P penetrating through the second electrode layer, and the second electrode layer 132 may further include a groove portion formed on a surface of the second electrode layer 132, not penetrating through the second electrode layer 132.

The second electrode layer 132 may serve to improve an area in which the first plating layer 134 is formed by including a plurality of openings P penetrating through the second electrode layer. In addition, due to the openings P of the second electrode layer 132, the second electrode layer 132 may have irregularities formed thereon. Accordingly, an anchor effect may be applied to the first plating layer 134. That is, as the second electrode layer 132 includes a plurality of openings P penetrating through the second electrode layer 132, a formation area of the plating layer 134 is increased, and the anchor effect may be caused, so that adhesion of the external electrode 130 can be improved. Accordingly, the moisture resistance reliability of the multilayer electronic component 100 can be improved.

According to another aspect of the present disclosure, in an embodiment of the multilayer electronic component 100, the intermediate layer 133 may include an oxide including Cu in a region 133a disposed on the plurality of openings P and an oxide including Ni in a region 133b disposed on the second electrode layer.

Referring to FIG. 6, the intermediate layer 133 may be divided into a region 133a disposed on the plurality of openings P and a region 133b disposed on the second electrode layer. When a heat-treatment process of forming an intermediate layer 133 and then removing hydrogen is performed, a plurality of openings P penetrating through the second electrode layer 132 may be formed. At the same time, a surface of the second electrode layer 132 and a surface of the first electrode layer 131 exposed to the openings P may be oxidized. Meanwhile, since the first electrode layer 131 includes Cu, when an oxide including Cu is formed on the surface of the first electrode layer 131, there may be a problem that adhesion with the first plating layer 134 including Ni is reduced. According to an embodiment of the present disclosure, since the interlayer 133 includes an oxide containing Ni in a region 133b disposed on the second electrode layer, it is possible to suppress deterioration of the adhesion of the first plating layer 131 may be further suppressed as compared to when the intermediate layer 133 is made of only an oxide containing Cu. Therefore, the moisture resistance reliability of the multilayer electronic component 100 can be further improved.

Referring to FIG. 7, in an embodiment of another aspect of the multilayer electronic component 100 in an embodiment of the present disclosure, the intermediate layer 133 may be partially disposed on the plurality of openings P and the second electrode layer 132. Accordingly, the first plating layer 134 is formed in a gap in which the intermediate layer 133 is partially formed, thereby maximizing the anchor effect. Therefore, the moisture resistance reliability of the multilayer electronic component 100 can be further improved.

In addition, various embodiments of the multilayer electronic component 100 according to an embodiment of the present disclosure may be applied to another aspect of the multilayer electronic component 100 in an embodiment of the present disclosure.

In addition, the expression 'one embodiment' used in the present disclosure does not mean the same embodiment, and is provided to emphasize and describe different unique characteristics. However, one embodiment presented above is not excluded from being implemented in combination with features of another embodiment. For example, even if a matter described in one specific embodiment is not described in another embodiment, it can be understood as a description related to another embodiment, unless there is a description contradicting or contradicting the matter in the other embodiment.

Terms used in this disclosure are only used to describe one embodiment, and are not intended to limit the disclosure. In this case, singular expressions include plural expressions unless the context clearly indicates otherwise.

As set forth above, according to one of the various effects of the present disclosure, a plating layer may be formed on an electrode layer of an external electrode, and even an interlayer oxide layer is formed in a process of removing hydrogen, by adjusting a shape of the electrode layer and a component of the oxide layer, interlayer adhesion thereof may be improved.

According to one of the various effects of the present disclosure, by improving the interlayer adhesion of the external electrodes, deterioration of a multilayer electronic component may be suppressed and moisture resistance reliability may be improved.

However, the various advantageous advantages and effects of the present disclosure are not limited to the above description, and will be more easily understood in the process of describing specific embodiments of the present disclosure.

While example embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and an internal electrode; and
an external electrode disposed on the body,
wherein the external electrode includes a first electrode layer connected to the internal electrode and including Cu, a second electrode layer partially disposed on the first electrode layer and including Ni, an intermediate layer disposed on the second electrode layer and in a region of the first electrode layer, in which the second electrode layer is not disposed, and including a metal oxide, and a first plating layer disposed on the intermediate layer and including Ni.

2. The multilayer electronic component of claim 1, wherein the metal oxide included in the intermediate layer comprises at least one of an oxide including Cu and an oxide including Ni.

3. The multilayer electronic component of claim 2, wherein the oxide including Cu includes at least one of CuO, $Cu_2O$, and $Cu_3O_4$, and the oxide including Ni includes NiO.

4. The multilayer electronic component of claim 1, wherein the intermediate layer comprises an oxide including Cu in a region disposed on the first electrode layer in which the second electrode layer is not disposed, and an oxide including Ni in a region disposed on the second electrode layer.

5. The multilayer electronic component of claim 1, wherein the second electrode layer is porous.

6. The multilayer electronic component of claim 1, wherein the intermediate layer is partially disposed on the first electrode layer and the second electrode layer.

7. The multilayer electronic component of claim 1, wherein the first electrode layer further comprises glass.

8. The multilayer electronic component of claim 1, wherein the intermediate layer comprises an oxide including metal included in the first electrode layer and an oxide including metal included in the second electrode layer.

9. The multilayer electronic component of claim 1, wherein the first electrode layer has an average thickness of 2 µm or more.

10. The multilayer electronic component of claim 1, wherein the external electrode further comprises a second plating layer disposed on the first plating layer and including Sn.

11. The multilayer electronic component of claim 1, wherein the second electrode layer does not comprise glass.

12. A multilayer electronic component, comprising:
a body including a dielectric layer and an internal electrode; and
an external electrode disposed on the body,
wherein the external electrode includes a first electrode layer connected to the internal electrode and including Cu, a second electrode layer disposed on the first electrode layer and including Ni, an intermediate layer disposed on the second electrode layer and including a metal oxide, and a first plating layer disposed on the intermediate layer and including Ni,
wherein the second electrode layer includes a plurality of openings penetrating through the second electrode layer,
wherein the intermediate layer is disposed on the second electrode layer and the plurality of openings.

13. The multilayer electronic component of claim 12, wherein the metal oxide included in the intermediate layer comprises at least one of an oxide including Cu and an oxide including Ni.

14. The multilayer electronic component of claim 13, wherein the oxide including Cu includes at least one of CuO, $Cu_2O$, and $Cu_3O_4$, and the oxide including the Ni includes NiO.

15. The multilayer electronic component of claim 12, wherein the intermediate layer comprises an oxide including Cu in a region on the plurality of openings, and oxide including Ni in a region on the second electrode layer.

16. The multilayer electronic component of claim 12, wherein the intermediate layer is partially disposed on the plurality of openings and the second electrode layer.

17. The multilayer electronic component of claim 12, wherein the first electrode layer further comprises glass.

18. The multilayer electronic component of claim 12, wherein the intermediate layer comprises an oxide including metal included in the first electrode layer and an oxide including metal included in the second electrode layer.

19. The multilayer electronic component of claim 12, wherein the first electrode layer has an average thickness of 2 µm or more.

20. The multilayer electronic component of claim 12, wherein the external electrode further comprises a second plating layer disposed on the first plating layer and including Sn.

21. The multilayer electronic component of claim 12, wherein the second electrode layer does not comprise glass.

22. A multilayer electronic component, comprising:
a body including a dielectric layer and an internal electrode; and
an external electrode disposed on the body to connect to the internal electrode,
wherein the external electrode includes a first electrode layer connected to the internal electrode, a second electrode layer disposed on the first electrode layer and including an opening penetrating through the second electrode layer, a first plating layer covering the second electrode layer and disposed in the opening to cover the first electrode layer, and an oxide layer disposed between the second electrode layer and the first plating layer and disposed in the opening to be between the first electrode layer and the first plating layer.

23. The multilayer electronic component of claim 22, wherein a portion of the oxide layer disposed in the opening to be between the first electrode layer and the first plating layer includes an oxide of a metal included in the first electrode layer, and a portion of the oxide layer disposed between the second electrode layer and the first plating layer includes an oxide of a metal included in the second electrode layer.

24. The multilayer electronic component of claim 23, wherein the metal included in the first electrode layer includes Cu, and the metal included in the second electrode layer includes Ni.

25. The multilayer electronic component of claim 24, wherein the first electrode layer includes a sintered electrode layer including Cu and glass, and the second electrode layer includes a Ni plating layer.

26. The multilayer electronic component of claim 25, wherein the first plating layer includes a Ni plating layer, and the external electrode further includes a Sn plating layer disposed on the first plating layer.

27. The multilayer electronic component of claim 22, wherein the oxide layer is thinner than the first electrode layer, the second electrode layer, and the first plating layer.

* * * * *